Oct. 22, 1929.  J. MOSCINI  1,732,610
AUTOMATIC REVERSING GEAR MECHANISM
Filed Jan. 5, 1928
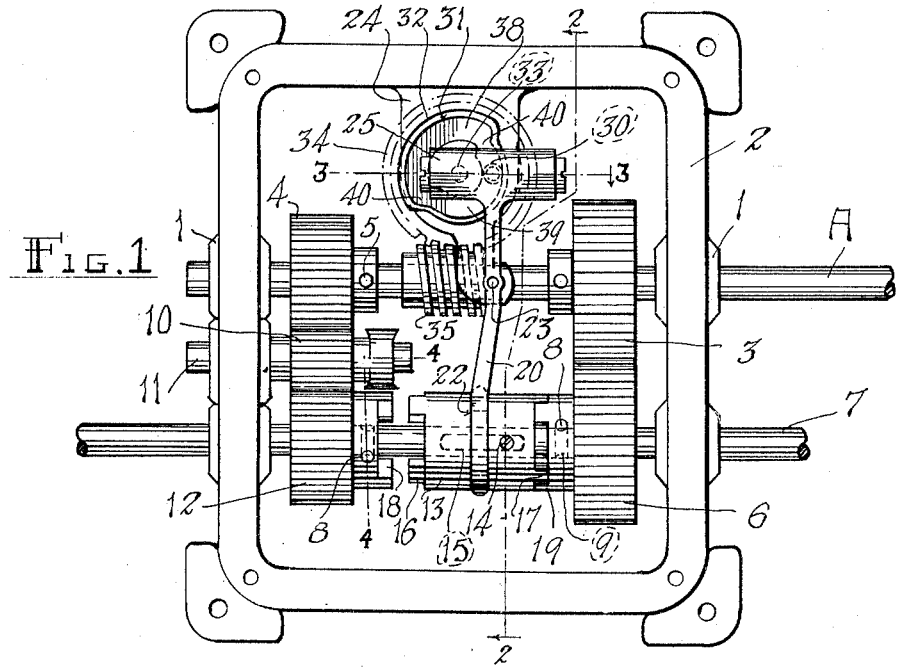
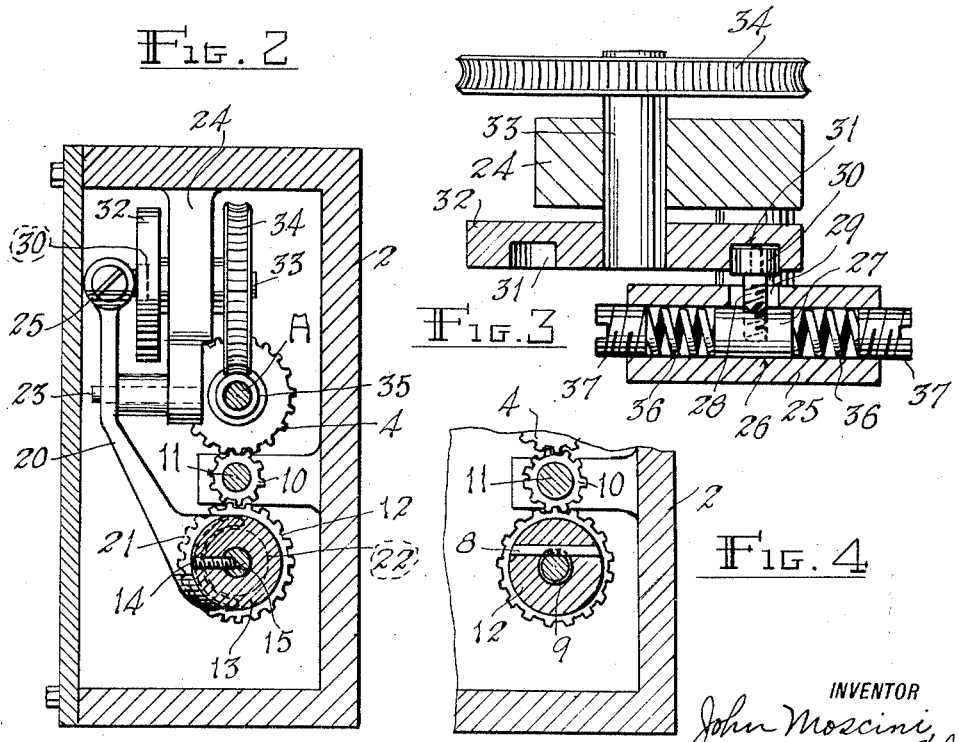
INVENTOR
John Moscini,
BY
Everett Cook,
ATTORNEYS.

Patented Oct. 22, 1929

1,732,610

UNITED STATES PATENT OFFICE

JOHN MOSCINI, OF NEWARK, NEW JERSEY

AUTOMATIC REVERSING-GEAR MECHANISM

Application filed January 5, 1928. Serial No. 244,570.

This invention relates to mechanism for transmitting motion from a driving member to a driven member and for automatically reversing the direction of movement of the driven member.

One object of the invention is to provide a reversing gear of the character described embodying novel and improved features of construction whereby the direction of movement of the driven member is automatically reversed through the instrumentality of a cam actuated mechanism constantly driven by the driving member.

Other objects are to provide mechanism of this character including a clutch for connecting the driven member to the driving member, and means for permitting yielding relative movement of the clutch and the clutch actuating mechanism to avoid jamming or breaking of the clutch or other parts of the mechanism; to thus provide a clutch operating lever and means for actuating the lever connected to the lever for yielding relative movement in both directions; to provide in such mechanism a lever having a part interposed between two springs and to be connected to actuating mechanism, whereby said part may yield against the influence of either of said springs, and to obtain other advantages and results as may be brought out by the following description.

In the accompanying drawings I have shown the now preferred embodiment of my invention, but it will be understood that this is primarily for the purpose of illustrating the principles of the invention and that many modifications and changes may be made in the details of construction of the mechanism without departing from the spirit or scope of the invention.

Referring to said drawings, in which corresponding and like parts are designated throughout the several views by the same reference characters, Figure 1 is a front elevation of reversing gear mechanism embodying my invention, the cover being removed from the casing;

Figure 2 is a transverse vertical sectional view, taken on the line 2—2 of Figure 1;

Figure 3 is a horizontal sectional view, taken on the line 3—3 of Figure 1, and

Figure 4 is a vertical sectional view, taken on the line 4—4 of Figure 1.

Specifically describing the illustrated embodiment of the invention, the reference character A designates a driving shaft which may be connected to any suitable source of power and is journaled in bearings 1 in a suitable gear casing 2. Gears 3 and 4 are rigidly connected to said shaft within the gear casing in any suitable manner, as by pins 5, so as to rotate with the said shaft, and one of said gears, in the present instance the gear 3, meshes with a similar gear 6 rotatable but longitudinally immovable upon a driven shaft 7. This connection of the gear 6 to the shaft 7 may be of any suitable type, but is shown as comprising a transverse pin 8 arranged in a circumferential groove 9 on the periphery of the shaft 7. The other gear 4 meshes with in idler 10 on a stub shaft 11, and said idler meshes with another gear 12 rotatable but longitudinally immovable upon the shaft 7 similarly to the gear 6. With this construction it will be observed that with the driving shaft A rotated, both the gears 6 and 12 will be constantly rotated independently of the shaft 7 but in opposite directions.

In accordance with the invention, means is provided for automatically and alternately connecting the gears 6 and 12 to the shaft 7 so as to rotate said shaft alternately in opposite directions. This means comprises a double-faced clutch sleeve 13 longitudinally movable upon the shaft 7 but held against rotation on the shaft by means of a screw 14 slidable in a keyway 15 in the shaft. The opposite faces 16 and 17 of said clutch sleeve are adapted to cooperate with respective clutch faces 18 and 19 on the respective gears 12 and 6, so that upon movement of the clutch sleeve 13 in one direction, the clutch faces 17 and 19 engage to connect the gear 6 to the shaft 7, while upon movement of the sleeve 13 in the other direction the clutch faces 16 and 18 engage to connect the gear 12 to the shaft 7.

The sleeve 13 is moved longitudinally of the shaft 7 by a clutch lever 20 having the usual forked end 21 arranged in a circumferential groove 22 in the sleeve 13, said clutch lever being pivotally mounted intermediate its ends, as at 23, upon a bracket 24 formed integral with the gear casing 2. The other end of the lever 20 has a head 25 formed with an opening 26 therethrough at substantially right angles to the axis of the pivot 23. Within said opening 26 is slidable a block 27 which has a stud 28 projecting therefrom outwardly through a slot 29 in the head 25. A roller 30 is journaled upon the outer end of the stud 28 and is fitted within a cam groove 31 in a disk 32 fast upon a shaft 33 journaled in the bracket 24 and also having connected thereto a worm gear 34 which meshes with a worm 35 on the driving shaft A. The block 27 is interposed between two compression springs 36, the compression of which is adjustable by screw plugs 37 in the ends of the opening 26. The cam groove 31 is composed of two concentric portions 38 and 39 of different radii merging into each other in diametrically opposite offsets 40.

With this construction it will be observed that the cam disk 32 will be constantly rotated by the driving shaft A, and the clutch sleeve 13 will be reciprocated alternately in opposite directions on the shaft 7 by engagement of the walls of the groove 31 with the roller 30, the offsets 40 causing the oscillation of the clutch lever 20 while the portions 38 and 39 of the groove hold the clutch in the respective positions. The springs 36 absorb all shocks incident to oscillation of the lever 20. For example, should the clutch faces not immediately properly engage each other, one or the other of the springs 36 will yield to absorb the constant pressure exerted by the cam groove 31 on the lever 20 until the clutch faces do properly engage, whereupon the spring will move the clutch sleeve with a snap action. All possibility of damage to the clutch lever, the clutch faces, and the actuating mechanism is therefore obviated, and reliable operation of the mechanism for long periods of time is ensured.

Having thus described the invention, what I claim is:

1. Automatic reversing gear mechanism, comprising a driving member, a driven member, a pair of gears rigidly secured to one of said members, another pair of gears rotatable but longitudinally immovable upon the other member, one of the second-mentioned pair of gears meshing with one of the first-mentioned gears, an idler gear meshing with both the other gears, clutch mechanism including a clutch element upon each of said second-mentioned pair of gears, a clutch sleeve slidable but non-rotatable upon the second-mentioned member to cooperate alternately with said clutch elements upon sliding movement of said clutch sleeve in opposite directions, a clutch lever for actuating said clutch sleeve, a rotatable cam, a driving connection between said cam and said driving member, a follower roller, and means connecting said roller to said lever to permit relative yielding movement of said roller and said lever.

2. Automatic reversing gear mechanism, comprising a driving member, a driven member, a pair of gears rigidly secured to one of said members, another pair of gears rotatable but longitudinally immovable upon the other member, one of the second-mentioned pair of gears meshing with one of the first-mentioned gears, an idler gear meshing with both the other gears, clutch mechanism including a clutch element upon each of said second-mentioned pair of gears, a clutch sleeve slidable but non-rotatable upon the second-mentioned member to cooperate alternately with said clutch elements upon sliding movement of said clutch sleeve in opposite directions, a clutch lever for actuating said clutch sleeve, a rotatable cam having a cam groove, a follower roller engaging said groove, and means including a pair of opposed springs influencing said roller from opposite directions for connecting said roller to said lever so as to permit relative yielding movement of said lever and said roller.

3. Automatic reversing gear mechanism, comprising a driving member, a driven member, a pair of gears rigidly secured to one of said members, another pair of gears rotatable but longitudinally immovable upon the other member, one of the second-mentioned pair of gears meshing with one of the first-mentioned gears, an idler gear meshing with both the other gears, clutch mechanism including a clutch element upon each of said second-mentioned pair of gears, a clutch sleeve slidable but non-rotatable upon the second-mentioned member to cooperate alternately with said clutch elements upon sliding movement of said clutch sleeve in opposite directions, a clutch lever for actuating said clutch sleeve, a rotatable cam, a block movable upon said lever in opposite directions in the plane of movement of the lever, a follower roller journaled on said block and engaging said cam, and a spring means for yieldingly resisting movement of said block in both directions.

4. Mechanism of the character described, comprising a driving member, a driven member, clutch mechanism for connecting and disconnecting said members including a lever, a disk having a cam groove, a block movable upon said lever in the plane of movement thereof, a roller journaled on said block and engaging said groove, and spring means yieldingly resisting movement of said block in the direction incident to actuating the clutch mechanism to connect said members.

JOHN MOSCINI.